Figure 1:
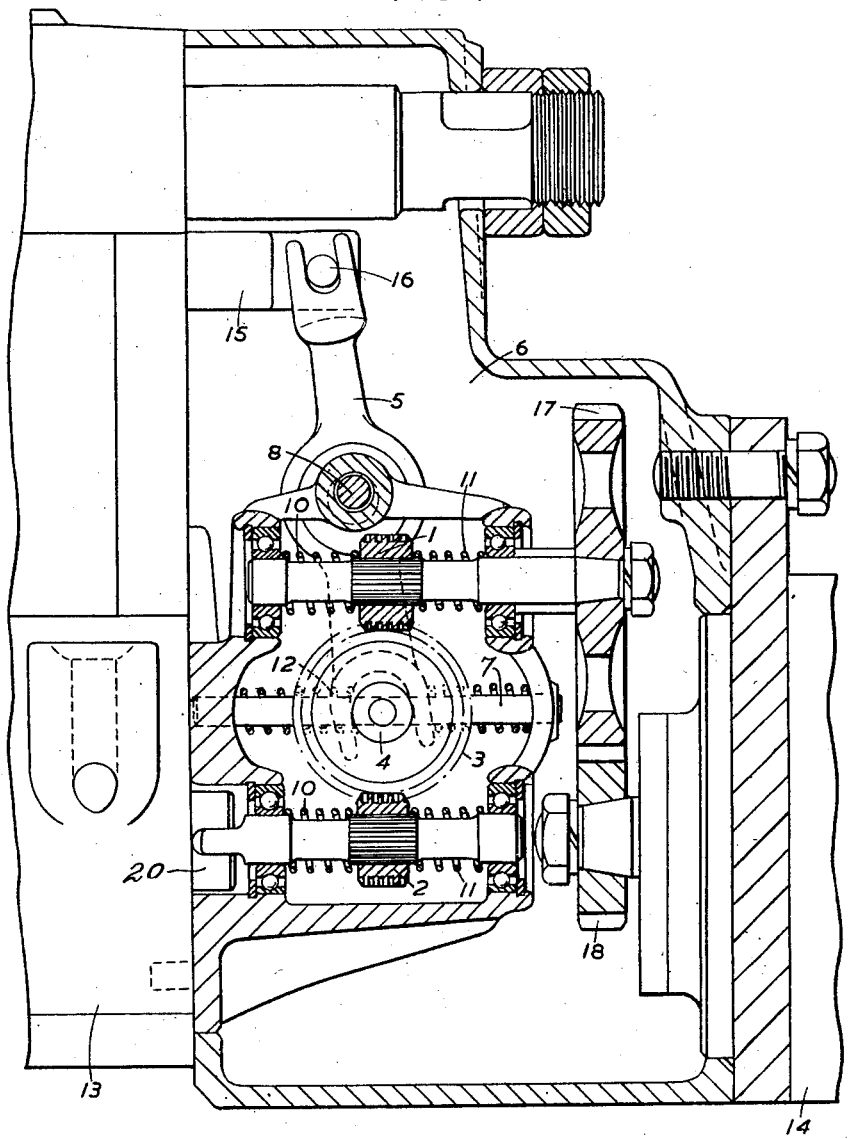

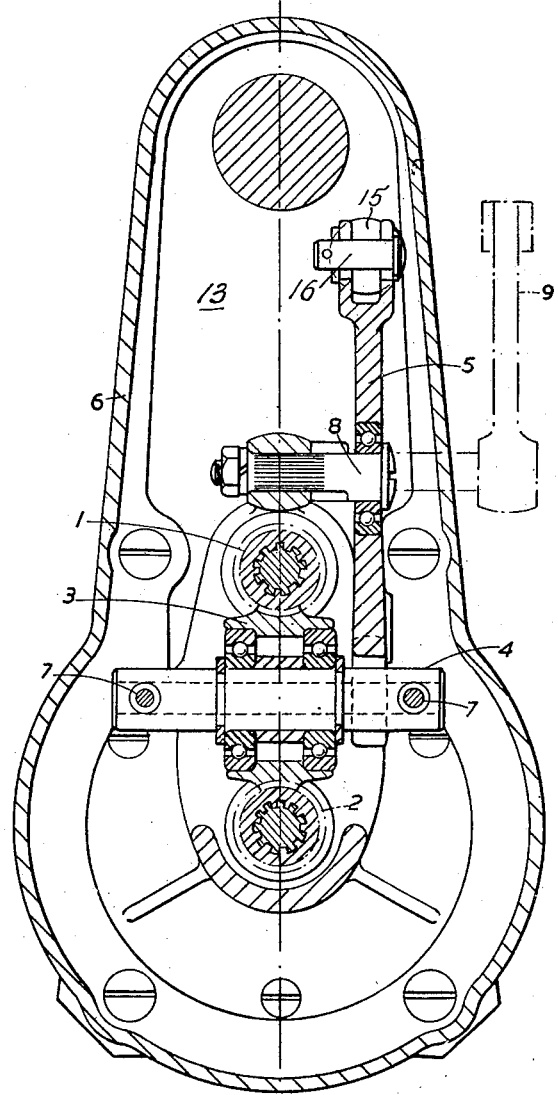

Patented Dec. 23, 1952

2,622,532

UNITED STATES PATENT OFFICE 2,622,532

MEANS FOR CONTROLLING, REGULATING, OR GOVERNING SPEEDS OF ROTATION

William Wilson Hamill, Little Aston, England

Application September 22, 1947, Serial No. 775,460
In Great Britain September 28, 1946

10 Claims. (Cl. 103—37)

This invention relates to means for controlling, regulating, or governing speeds of rotation of the kind including two rotors, one of which is driven to revolve at the speed of the controlled body or at a speed having a direct relation thereto, and the other of which is driven to revolve at a constant speed, the arrangement being such that speed differential between the two rotors is adapted to move a control member connected with the control organ of the controlled body.

The invention is applicable generally as aforesaid including specific applications to road or rail vehicles to compensate for changes in the gradient, or in tractive effort, or road resistance, or wind pressure; to vessels to adjust for variations in wind pressure and/or direction, or currents, or loss of power of one or more units through wear and tear and other causes; to speed limiting devices incorporated for reasons of safety or to conform to legal maximum speeds; or to machines carrying out processes in which a selected rate of working must not be exceeded, and wherein the power required may vary due to changes in the physical resistance varying by reason of changes in hardness, plasticity, viscosity, etc.

One object of the invention is an improved mechanism or means applicable as aforesaid; another object is the provision of apparatus suitable for association with a pump such as is employed to deliver fuel to internal combustion engines of the compression ignition type; further objects will appear in a perusal of the following description.

Apparatus according to the invention includes a floating gear element arranged to operate the control organ of the controlled body, and two gear elements in driving connection therewith one of which elements is driven at a constant speed while the other is driven at the speed of the controlled body or at a speed having a direct relation thereto, mounted to co-operate so that any differential between the two driven elements causes the wheel to be displaced in its own plane and produce a resultant movement of a control member.

The invention further consists in apparatus including a driving element driven to revolve at a constant speed by means of an electric motor, a second driving element driven from the rotary shaft of a liquid fuel pump, a wheel coupling said driving elements arranged for movement in its own plane in a path normal to its axis as a result of speed differential between the two driving elements, and a lever or other means adapted to transmit the displacement motion of the wheel to the control member of the fuel pump by which the delivery of oil is regulated. This combination of fuel pump, motor and governing apparatus may be combined together to form a single structure which is compact and effective.

Reference may be had to the accompanying drawings in which Figure 1 is an elevation partly in section of means according to the invention.

Figure 2 is a sectional elevation looking at right angles to Figure 1.

Referring now to the drawings, the present invention is specifically shown as a preferred embodiment in combination with a fuel pump 13 for and driven by an internal combustion engine (not shown) although it will be understood that the invention contemplates other types of controlled bodies. The fuel pump 13 may be of any conventional type except that it must include a drive shaft that may be driven by the associated engine and has a coupling extension 20 protruding from the pump casing and in combination has a movable control element or organ 15 for controlling the discharge or feed of the pump and also extending from the casing. According to the preferred embodiment, both the shaft coupling 20 and the control element 15 protrude from the same side of the pump casing.

In one convenient embodiment of the invention, a displaceable drive or coupling member, between two driving elements 1, 2 such as screw worms, preferably takes the form of a worm 3 or similar wheel mounted to rotate (preferably on ball bearings) on a movably supported non-rotating shaft 4 which is arranged to operate a control member through which motion is transmitted to the control organ 15 of the controlled body 13, such as a throttle, rheostat, rotatable sleeve of a fuel pump, or other device. The control member preferably consists of a lever 5 of the first order fulcrumed or pivoted in or on the casing or part thereof wherein the apparatus is enclosed. The lever has one end bifurcated to straddle the wheel shaft 4, and the other constructed in any appropriate manner for connection to the control organ 15, such connection being mechanical, hydraulic, pneumatic, or electrical, or a combination thereof according to the requirements or exigencies of the application. According to the preferred form, the other end of the lever 5 is also bifurcated to straddle a pin 16 on the control organ 15. Any suitable expedient is incorporated for permitting the displaceable wheel 3 to move in execution of its controlling function e. g. a pair of parallel spaced guide rods 7, one each side of the wheel 3, along which the shaft 4 can slide.

The fulcrum shaft 8 of the lever may be extended, if desired, to the outside of the casing 5 and furnished with a lever 9 to provide over-riding hand control and enable the position of the control member to be varied without reference to the automatic setting thereof, movement of the lever 5 and wheel 3 being accompanied by an endwise displacement of the worms 1 and 2 against the pressure of the springs 10, 11.

When the two worms or driving elements 1, 2 are rotating at the same speed, the displaceable wheel occupies a mid or neutral position, but speed differential between the two driving elements is resolved by travel of the displaceable wheel 3 through a path normal to its axis, one worm or element acting as an abutment to take the reaction pressure while the other provides the force and motion by which the wheel is so displaced. Such displacement of the wheel 3 rocks the control lever 5 on its fulcrum 8 and is transmitted as aforesaid to the control organ of the controlled body, the speed of rotation of which is thereby adjusted to the standard set by the speed of rotation of the constant speed motor or other source providing a constant speed. The rotational speed of the controlled body is thereby adjusted and maintained substantially constant irrespective of the variations in load, pressure, resistance, or other variable affecting the rotational speed of the controlled body. To avoid damage to the mechanism, the travel of the displaceable wheel 3 is sufficient to enable the wheel 3 to move out of engagement with one or both of the driving worms or elements and be remeshed when a change in differential occurs under the influence of a suitable force such as may be provided, for example, by compression springs 12, so that safety expedients such as slipping clutches with their inherent drawbacks are rendered unnecessary. If desired, complementary to or in lieu of the springs 12 the two driving worms may be axially movable and may each be maintained in the medium or mid position by a pair of coiled compression springs 10, 11 acting in opposition, one on each end face of the worm. In the event of the movement of the driving worms subject to the springs 10, 11, the movement of the wheel 3 in a path normal to its axis may preferably be limited by stops. The springs 10 and 11 are of sufficient strength to insure operation of the lever 5.

In a specific application of the invention to moving the control part of a liquid fuel pump such as used to deliver fuel to internal combustion engines, an open end face of the housing 6 of the apparatus is attached to an end face of the fuel pump casing 13 from which the control organ 15 and shaft coupling 20 both protrude. The opposite, closed end face of the casing 6 carries a constant speed electric motor 14, the whole forming a single combined unit. Through the end of the fuel pump casing is extended a rod or sleeve 15 in operative communication with the control parts of the fuel pump, and engaging by pin and slot connection 16 the lever 5. The variable speed shaft and worm or driving element 2 are in driving engagement with the rotary drive shaft 20 of the fuel pump while the other worm or driving element 1 and its shaft are coupled direct to the armature of the constant speed motor, or for convenience in velocity ratio through the medium of spur wheels 17, 18 giving a two to one reduction between the motor and worm or driving element 1.

Having thus described my invention, what I claim is:

1. Speed controlling mechanism for a controlled body having a variable speed drive organ and a control organ for regulating the speed of the drive organ, comprising a constant speed driving element, means for driving said element at a substantially constant speed, a variable speed driving element, means for connecting in driving relation said variable speed driving element to the drive organ so that the speed of said variable speed driving element varies in accordance with that of the drive organ, said driving elements being rotatable about spaced parallel axes, an intermediate drive element interposed between and in driving engagement with said driving elements, means connecting said intermediate drive element with the control organ of the controlled body, and means supporting said intermediate drive element for movement laterally of said driving elements in reaction to variation in speed between said driving elements and produce a resultant movement of the control organ to regulate the speed of the drive organ and maintain it at a substantially uniform speed.

2. Mechanism according to claim 1 in which the connecting means for operating the control organ includes an operator-operated control device for overriding the automatic action set up by the speed differential.

3. Speed controlling mechanism for a controlled body having a variable speed drive organ and a control organ for regulating the speed of the drive organ, comprising a constant speed driving element, means for driving said element at a substantially constant speed, a variable speed driving element, means for connecting in driving relation said variable speed driving element to the drive organ so that the speed of said variable speed driving element varies in accordance with that of the drive organ, said driving elements being rotatable about spaced parallel axes, an intermediate drive element interposed between and in driving engagement with said driving elements, means connecting said intermediate drive element with the control organ of the controlled body, means supporting said intermediate drive element for movement laterally of said driving elements in reaction to variation in speed between said driving elements and produce a resultant movement of the control organ to regulate the speed of the drive organ and maintain it at a substantially uniform speed, and means biasing said intermediate drive element to neutral position directly between said driving elements.

4. Speed controlling mechanism for a controlled body having a variable speed drive organ and a control organ for regulating the speed of the drive organ, comprising a constant speed driving gear element, means for driving said gear element at a substantially constant speed, a variable speed driving gear element, means for connecting in driving relation said variable speed driving gear element to the drive organ so that the speed of said variable speed driving gear element varies in accordance with that of the drive organ, said driving gear elements being rotatable about spaced parallel axes, an intermediate gear element interposed between and meshing with said driving gear elements, a lever connected at one end to said intermediate gear element and at the other end to the control organ of the controlled body, and means supporting said intermediate gear element for movement laterally of said driving gear elements in reaction to variation in speed between said driving gear elements and produce a resultant movement of the control organ through said lever to regulate the speed of the drive organ and maintain it at a substantially uniform speed.

5. Speed controlling mechanism for a controlled body having a variable speed drive organ and a control organ for regulating the speed of the drive organ, comprising a constant speed driving gear element, means for driving said gear element at a substantially constant speed, a variable speed driving gear element, means for connecting in driving relation said variable speed driving gear element to the drive organ so that the speed of said variable speed driving gear element varies in accordance with that of the drive organ, said driving gear elements being rotatable about spaced parallel axes, said driving gear elements being mounted on parallel axes, an intermediate gear element interposed between and meshing with said driving gear elements, means connecting said intermediate gear element with the control organ of the controlled body, and means supporting said intermediate gear element for sliding movement laterally of said driving gear elements and in a plane parallel to said driving gear axes in reaction to variation in speed between said driving gear elements and produce a resultant movement of the control organ to regulate the speed of the drive organ and maintain it at a substantially uniform speed.

6. Mechanism according to claim 5 in which the connecting means for operating the control organ includes a shaft on which the slidable gear element is rotatably mounted, guides for slidably supporting the said shaft, and a fulcrumed lever moved by the sliding movement of the said shaft.

7. Mechanism according to claim 5 in which the connecting means for operating the control organ includes a shaft on which the slidable gear element is rotatably mounted, guides for slidably supporting the said shaft, and a fulcrumed lever moved by the sliding movement of the said shaft, the shaft on which the said lever is fulcrumed being provided with an operator-operated control device for overriding the automatic action set up by the speed differential.

8. Mechanism according to claim 5 wherein the sliding movement of the intermediate gear element is sufficient to enable the element to move out of engagement with at least one of said driving elements, by a cumulative amount of differential, and spring means for re-engaging the intermediate gear element by ensuing reduction in differential.

9. Speed controlling mechanism for a controlled body having a variable speed drive organ and a control organ for regulating the speed of the drive organ, comprising a constant speed driving gear element, means for driving said gear element at a substantially constant speed, a variable speed driving gear element, means for connecting in driving relation said variable speed driving gear element to the drive organ so that the speed of said variable speed driving gear element varies in accordance with that of the drive organ, said driving gear elements being rotatable about spaced parallel axes, an intermediate gear element interposed between and meshing with said driving gear elements, means connecting said intermediate gear element with the control organ of the controlled body, said driving gear elements being slidably supported on but keyed to their supporting shafts, means biasing said driving gear elements to neutral positions on their shafts, means supporting said intermediate gear element for movement laterally of said driving gear elements in reaction to the sliding action and the variation in speed between said driving elements and produce a resultant movement of the control organ to regulate the speed of the drive organ and maintain it at a substantially uniform speed, and means biasing said intermediate gear element to neutral position between said driving gear elements.

10. Governor control mechanism for a liquid fuel pump having a power input rotary shaft and a volume control element, said governor control mechanism comprising a worm gear element, means for drivingly connecting said element with the pump shaft, a worm type wheel driven by said gear element, a non-rotatable shaft rotatably supporting said worm wheel, guides slidably supporting said non-rotatable shaft, a second worm type gear element axially parallel with said first worm type gear element and also in mesh with the worm type wheel at substantially the opposite side thereof from said first element, an electric motor for driving the second worm type gear element at constant speed, means for communicating the sliding movement of the worm wheel shaft to the volume control element of the pump, and a housing enclosing said governor mechanism and supporting said electric motor to provide a unitary construction.

WILLIAM WILSON HAMILL.

REFERENCES CITED

The following references are of record in the file of this patent:

UNITED STATES PATENTS

| Number | Name | Date |
|---|---|---|
| 886,047 | Flinn | Apr. 28, 1908 |
| 1,502,195 | Hicks | July 22, 1924 |
| 1,572,365 | Rotter | Feb. 9, 1926 |
| 1,682,570 | Holveck | Aug. 28, 1928 |
| 1,983,229 | Hillier et al. | Dec. 4, 1934 |
| 2,172,103 | Kotaki | Sept. 5, 1939 |
| 2,350,434 | Wallgren et al. | June 6, 1944 |